United States Patent
Kurokawa

(10) Patent No.: US 9,951,806 B2
(45) Date of Patent: Apr. 24, 2018

(54) TELESCOPIC SHAFT

(71) Applicant: NSK LTD., Tokyo (JP)

(72) Inventor: Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 140 days.

(21) Appl. No.: 15/063,726

(22) Filed: Mar. 8, 2016

(65) Prior Publication Data

US 2016/0186798 A1    Jun. 30, 2016

Related U.S. Application Data

(62) Division of application No. 14/239,626, filed as application No. PCT/JP2012/077507 on Oct. 24, 2012, now abandoned.

(30) Foreign Application Priority Data

Nov. 30, 2011    (JP) .................................. 2011-263121

(51) Int. Cl.
*F16D 3/06* (2006.01)
*F16C 3/03* (2006.01)
(Continued)

(52) U.S. Cl.
CPC .................. *F16C 3/03* (2013.01); *B62D 1/16* (2013.01); *B62D 1/20* (2013.01); *F16D 1/101* (2013.01);
(Continued)

(58) Field of Classification Search
CPC ..... B62D 1/16; B62D 1/20; F16C 3/03; F16C 2326/24; F16C 2001/103; F16D 1/101; F16D 3/06; Y10T 403/7026
(Continued)

(56) References Cited

U.S. PATENT DOCUMENTS 3,813,899 A    6/1974  Abrahamer
4,819,755 A    4/1989  Smemo et al.
(Continued)

FOREIGN PATENT DOCUMENTS

CN    1681697 A    10/2005
CN    1732103 A    2/2006
(Continued)

OTHER PUBLICATIONS

Universal Joint and Driveshaft Design Manual, AE-7, Society of Automotive Engineers, Inc., Warrendale, PA, pp. 185-198, TJ1079. S62 1979.
(Continued)

*Primary Examiner* — Gregory J Binda
(74) *Attorney, Agent, or Firm* — Sughrue Mion, PLLC

(57) ABSTRACT

A telescopic shaft includes a male shaft having an outer circumference formed with a plurality of protruding teeth, and a female shaft having an inner circumference formed with a plurality of tooth grooves and fitted onto the male shaft. The protruding teeth and the tooth grooves are engaged such that the male shaft and the female shaft are relatively axially slidable and a rotational torque is transmittable between the male shaft and the female shaft. At least one of the male shaft and the female shaft is configured such that the radial rigidity of a portion of the at least one of the male shaft and the female shaft in an axial range of a region where the protruding teeth and the tooth grooves are engaged is lower than the radial rigidity of another portion of the at least one of the male shaft and the female shaft.

3 Claims, 18 Drawing Sheets

(51) Int. Cl.
*B62D 1/16* (2006.01)
*B62D 1/20* (2006.01)
*F16D 1/10* (2006.01)

(52) U.S. Cl.
CPC ............ *F16D 3/06* (2013.01); *F16C 2326/24* (2013.01); *F16D 2001/103* (2013.01); *Y10T 403/7026* (2015.01)

(58) Field of Classification Search
USPC .................................................. 464/16, 162
See application file for complete search history.

(56) References Cited

U.S. PATENT DOCUMENTS

| | | | |
|---|---|---|---|
| 6,530,599 | B1 | 3/2003 | Oka |
| 7,713,131 | B2 | 5/2010 | Hahn |

FOREIGN PATENT DOCUMENTS

| | | | |
|---|---|---|---|
| EP | 0220986 | A2 | 5/1987 |
| EP | 0612649 | A1 | 8/1994 |
| EP | 1500832 | A1 | 1/2005 |
| JP | S43-001931 | B | 1/1968 |
| JP | 51-66651 | U | 5/1976 |
| JP | 55-120829 | U | 8/1980 |
| JP | 57-33322 | A | 2/1982 |
| JP | 60-7330 | A | 1/1985 |
| JP | 60-79094 | U * | 6/1985 |
| JP | 61-184222 | A | 8/1986 |
| JP | 5-19661 | U | 3/1993 |
| JP | 5-22143 | U | 3/1993 |
| JP | 5-75524 | U | 10/1993 |
| JP | 65-9630 | U | 8/1994 |
| JP | 7-248025 | A | 9/1995 |
| JP | 11-311256 | A | 11/1999 |
| JP | 2000-356225 | A | 12/2000 |
| JP | 2003-306152 | A | 10/2003 |
| JP | 2004-324863 | A | 11/2004 |
| JP | 2005-282711 | A | 10/2005 |
| JP | 2006-46498 | A | 2/2006 |
| JP | 2007-155009 | A | 6/2007 |
| JP | 2008-222016 | A | 9/2008 |
| JP | 2010-96308 | A | 4/2010 |
| JP | 2011-174607 | A | 9/2011 |

OTHER PUBLICATIONS

Extended Search Reported dated Jul. 22, 2015, issued by the European Patent Office in counterpart European Patent Application No. 12852627.4.

International Search Report, dated Jan. 29, 2013, issued by the International Searching Authority in counterpart International Application No. PCT/JP2012/077507.

Office Action dated Apr. 21, 2015, issued by the Japanese Patent Office in counterpart Japanese Application No. 2014-149165.

Office Action dated Jan. 27, 2015 issued by the State Intellectual Property Office of P.R. China in corresponding Application No. 201280001801.9.

Written Opinion, dated Jan. 29, 2013, issued by the International Searching Authority in counterpart International Application No. PCT/JP2012/077507.

Communication dated Mar. 29, 2016, issued by the Japanese Patent Office in counterpart Japanese Patent Application No. 2015-116119.

* cited by examiner

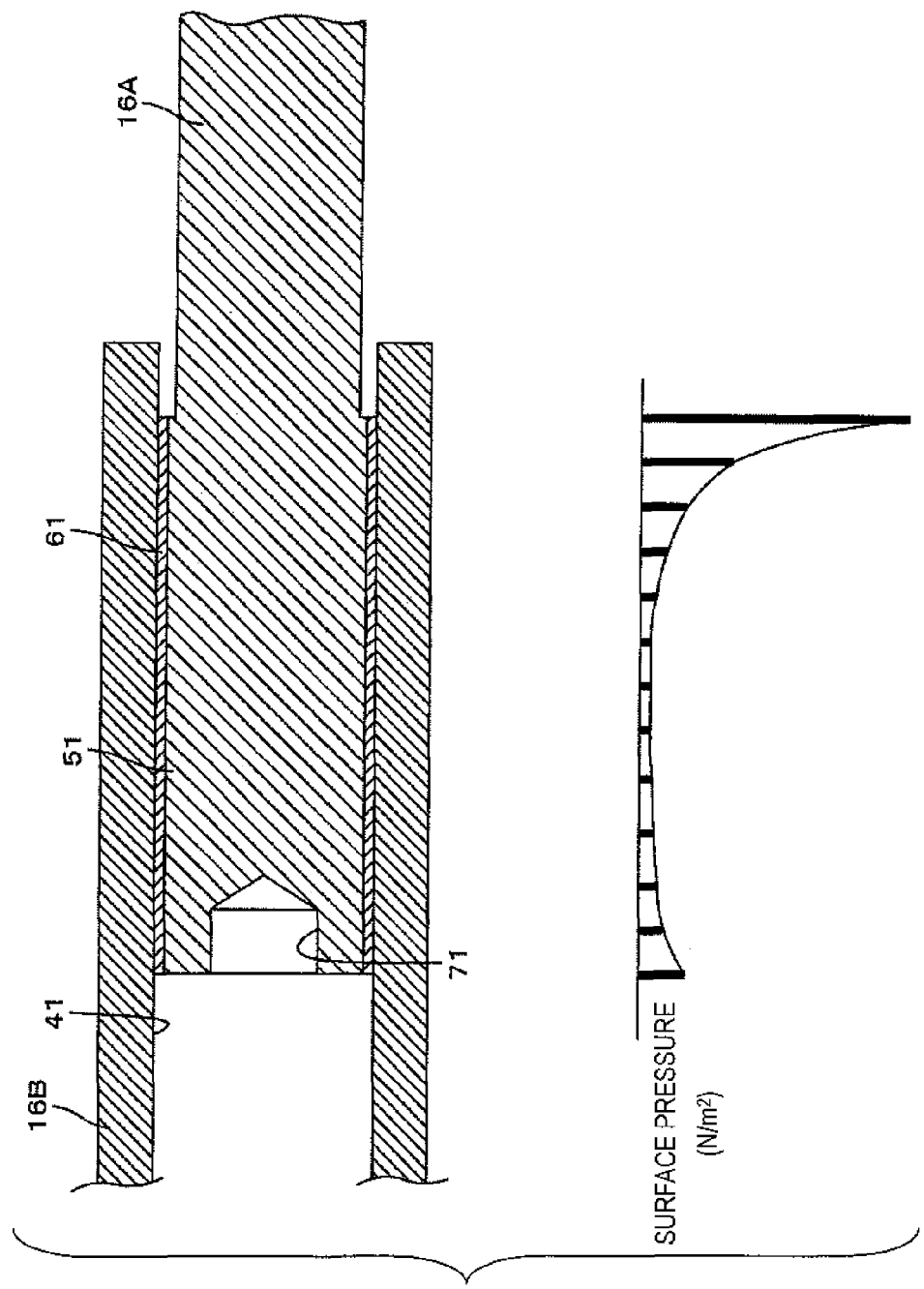

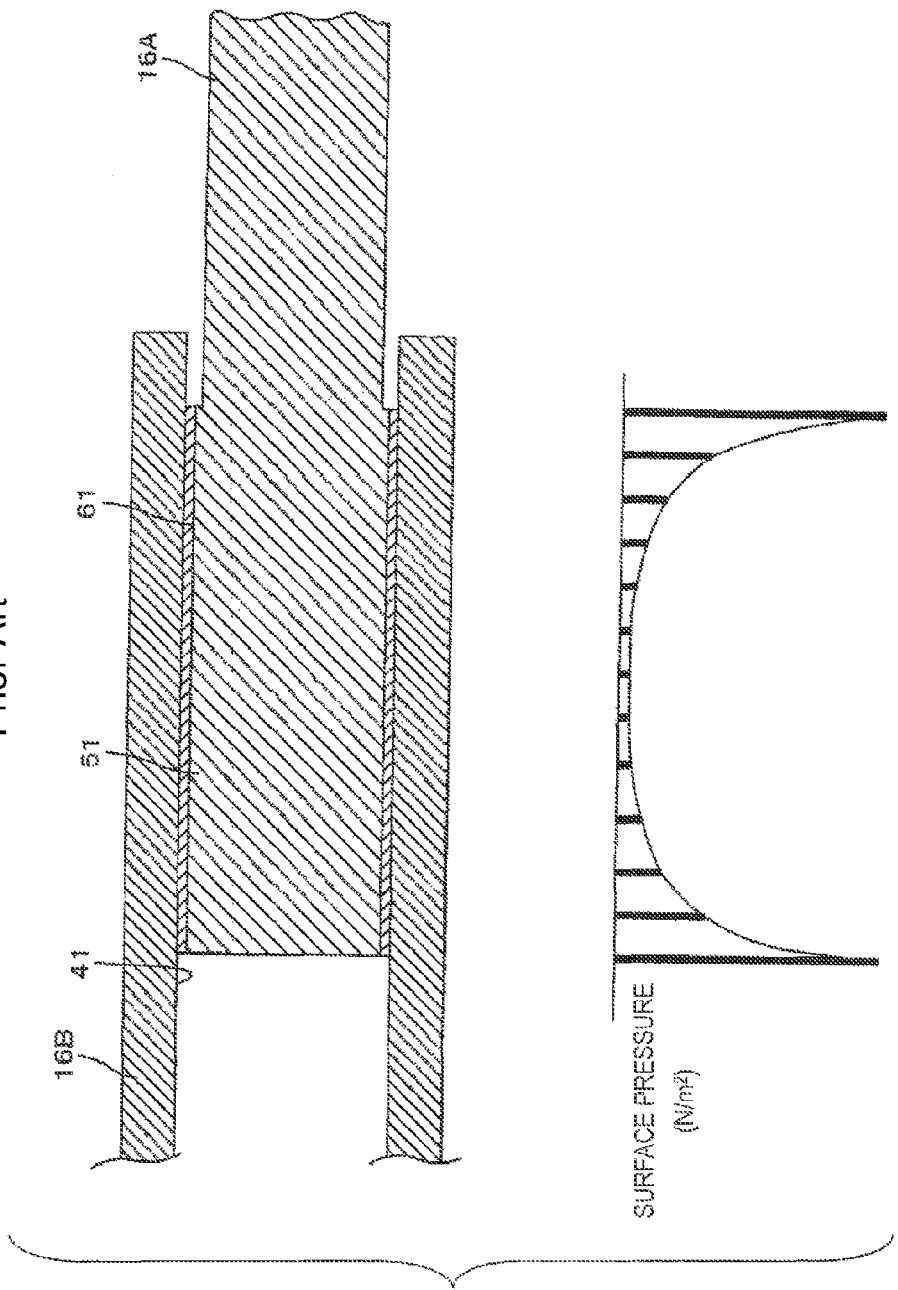

TELESCOPIC SHAFT

CROSS-REFERENCE TO RELATED APPLICATIONS

This is a divisional of pending U.S. patent application Ser. No. 14/239,626, filed Feb. 19, 2014 now abandoned, which is a 371 National Stage entry of PCT/JP2012/077507, filed Oct. 24, 2012, which claims benefit to Japanese Patent Application No. JP 2011-263121, filed Nov. 30, 2011, the entire disclosures of which are hereby incorporated by reference.

TECHNICAL FIELD

The present invention relates to a telescopic shaft including a male shaft and a female shaft which can transmit rotational torque and are relatively slidable in an axial direction.

BACKGROUND ART

A steering apparatus includes telescopic shafts such as an intermediate shaft and a steering shaft, each having a male shaft and a female shaft capable of transmitting rotational torque and connected to be relatively slidable in an axial direction. The intermediate shaft is required to have a telescopic function when joining a universal joint to a pinion shaft to be engaged with a rack shaft of a steering gear so that the intermediate shaft is temporarily compressed before being engaged and joined to the pinion shaft, and also to absorb relative displacement with respect to a vehicle body frame.

The steering shaft transmits a steering force of the steering wheel to vehicle wheels, and is required to have a telescopic function to adjust a position of the steering wheel in an axial direction in accordance with a physical size and a driving posture of a driver.

In recent years, due to improvements in rigidity of the entire vehicle body and driving stability, it became easier for drivers to feel backlash of a telescopic shaft in rotation direction when operating a steering wheel. Therefore, a telescopic shaft with less backlash in the rotation direction, low sliding resistance, and superior lubricity and durability is being desired.

For that reason, there is a telescopic shaft in which an outer circumference of a tooth surface of a male shaft is covered with a resin or the like having low sliding resistance, and after applying a lubricant, the male shaft is fitted into a female shaft. FIG. 6 is a cross-sectional view of a conventional male shaft and a female shaft fitted onto the male shaft, illustrating a surface pressure which is applied to a covered portion of the male shaft. As shown in FIG. 6, a conventional male shaft 16A (male spline shaft) is fitted into a female shaft 16B (female spline cylinder) such that it is possible to relatively slide in an axial direction and transmit rotational torque. Protruding teeth 51 of the solid male shaft 16A are coated with a covering portion 61 made of resin to reduce sliding resistance between the protruding teeth 61 and tooth grooves 41 of the female shaft 16B, and are fitted into the tooth grooves 41 such that a tooth surface of the tooth grooves 41 and the covering portion 61 have a small interference.

In this conventional telescopic shaft, as shown in FIG. 6, bending moments acting on both end portions of an engagement region of the protruding teeth 51 and the tooth grooves 41 in an axial direction are large, and thus surface pressures at the both end portions are high. Therefore, both end portions of the covering portion 61 in an axial direction are deteriorated, and a backlash may occur between the male shaft and the female shaft. Such a backlash may occur between the male shaft and the female shaft due to similar reason, even in a case where the covering portion 61 is not provided. Particularly, in a column assist type power steering apparatus, due to a couple of force generated at a universal joint, surface pressures acting on both end portions of an engagement region of protruding teeth 51 and tooth grooves 41 of an intermediate shaft in the axial direction are high, and the likelihood of backlash being generated between a male shaft and a female shaft is high.

In a telescopic shaft of Patent Document 1, a male shaft is covered with a resin layer containing a sheet-like filler such as mica, whereby deterioration of the resin layer is suppressed, and backlash between the male shaft and a female shaft is suppressed. However, Patent Document 1 does not consider surface pressures applied to the resin layer at both end portions of the male shaft in an axial direction.

A telescopic shaft of Patent Document 2 has a ball provided between a male shaft and a female shaft. In order to maintain a preload on the ball for a long time so that a play is less likely to occur even if it is used for a long time, a deformation facilitating portion, which is easy to be deformed, is formed in a given region of the female shaft in a circumferential direction so that the female shaft is easy to bend, whereby a stress applied on the female shaft or the ball is reduced. However, Patent Document 2 does not consider a difference in the surface pressure in an axial direction.

PRIOR ART DOCUMENTS

Patent Document

Patent Document 1: JP 2008-222016 A
Patent Document 2: JP 2006-112623 A

SUMMARY OF INVENTION

Problem to be Solved by Invention

It is an object of the present invention to provide a telescopic shaft suppressing a surface pressure in an engagement region of a male shaft and a female shaft from locally increasing in an axial direction, and suppressing backlash between the male shaft and the female shaft.

Means for Solving the Problem

According to an aspect of the present invention, a telescopic shaft includes a male shaft having an outer circumference on which a plurality of protruding teeth are formed, and a female shaft having an inner circumference on which a plurality of tooth grooves are formed, the female shaft being fitted onto the male shaft. The protruding teeth and the tooth grooves are engaged with each other such that the male shaft and the female shaft are relatively slidable in an axial direction and such that a rotational torque is transmittable between the male shaft and the female shaft. At least one of the male shaft and the female shaft is configured such that the radial rigidity of a portion of the at least one of the male shaft and the female shaft in an axial range of a region where the protruding teeth and the tooth grooves are engaged with each other is lower than the radial rigidity of another portion of the at least one of the male shaft and the female shaft.

The male shaft may be at least partially a solid shaft, and the portion of the male shaft corresponding to one end or both ends of the protruding teeth in the axial direction may be formed with a hole along the axial direction.

The male shaft may be at least partially a solid shaft, and the male shaft may be formed with a hole along the axial direction and over the entire length of the protruding teeth in the axial direction.

The male shaft may include a small-diameter portion in an axial range of the protruding teeth. The outside diameter of the small-diameter portion is smaller than the outside diameter of the other portion of the male shaft in the axial range of the protruding teeth.

The male shaft may be a hollow shaft, and the inside diameter of the portion of the male shaft corresponding to one end or each of both ends of the protruding teeth in the axial direction may be larger than the inside diameter of the other portion of the male shaft.

The male shaft may be a hollow shaft, and the inside diameter of the portion of the male shaft over the entire length of the protruding teeth in the axial direction may be larger than the inside diameter of the other portion of the male shaft.

The male shaft may include a small-diameter portion in an axial range of the protruding teeth. The outside diameter of the small-diameter portion is smaller than the outside diameter of the other portion of the male shaft in the axial range of the protruding teeth.

The female shaft may include a small-diameter portion in an axial range of the tooth grooves. The outside diameter of the small-diameter portion is smaller than the outside diameter of the other portion of the female shaft in the axial range of the tooth grooves.

The female shaft may include a small-diameter portion over the entire length of the tooth grooves in the axial direction. The outside diameter of the small-diameter portion is smaller than the outside diameter of the other portion of the female shaft.

The tooth grooves of the female shaft may be fitted onto the protruding teeth of the male shaft by an interference fit. On a tooth surface of the protruding teeth of the male shaft, a covering portion may formed to reduce sliding resistance between the protruding teeth and the tooth grooves of the female shaft.

Advantage of Invention

According to an aspect of the present invention, the radial rigidity of a portion of at least one of the male shaft and the female shaft in an axial range of a region where the protruding teeth and the tooth grooves are engaged with each other is lower than that of another portion of the at least one of the male shaft and the female shaft. Therefore, it is possible to avoid locally high surface pressure in the axial direction so as to suppress backlash between the male shaft and the female shaft.

BRIEF DESCRIPTION OF DRAWINGS

FIG. 5 is a cross-sectional view of the male shaft of FIG. 4 and a female shaft fitted onto the male shaft, illustrating a surface pressure applied to a covered portion of the male shaft.

FIG. 6 is a cross-sectional view of a conventional male shaft and a female shaft fitted onto the male shaft, illustrating a surface pressure applied to a covered portion of the male shaft.

EMBODIMENTS OF INVENTION

Hereinafter, embodiments of the present invention will be described in detail with reference to the drawings.

First Embodiment

Figure 1:
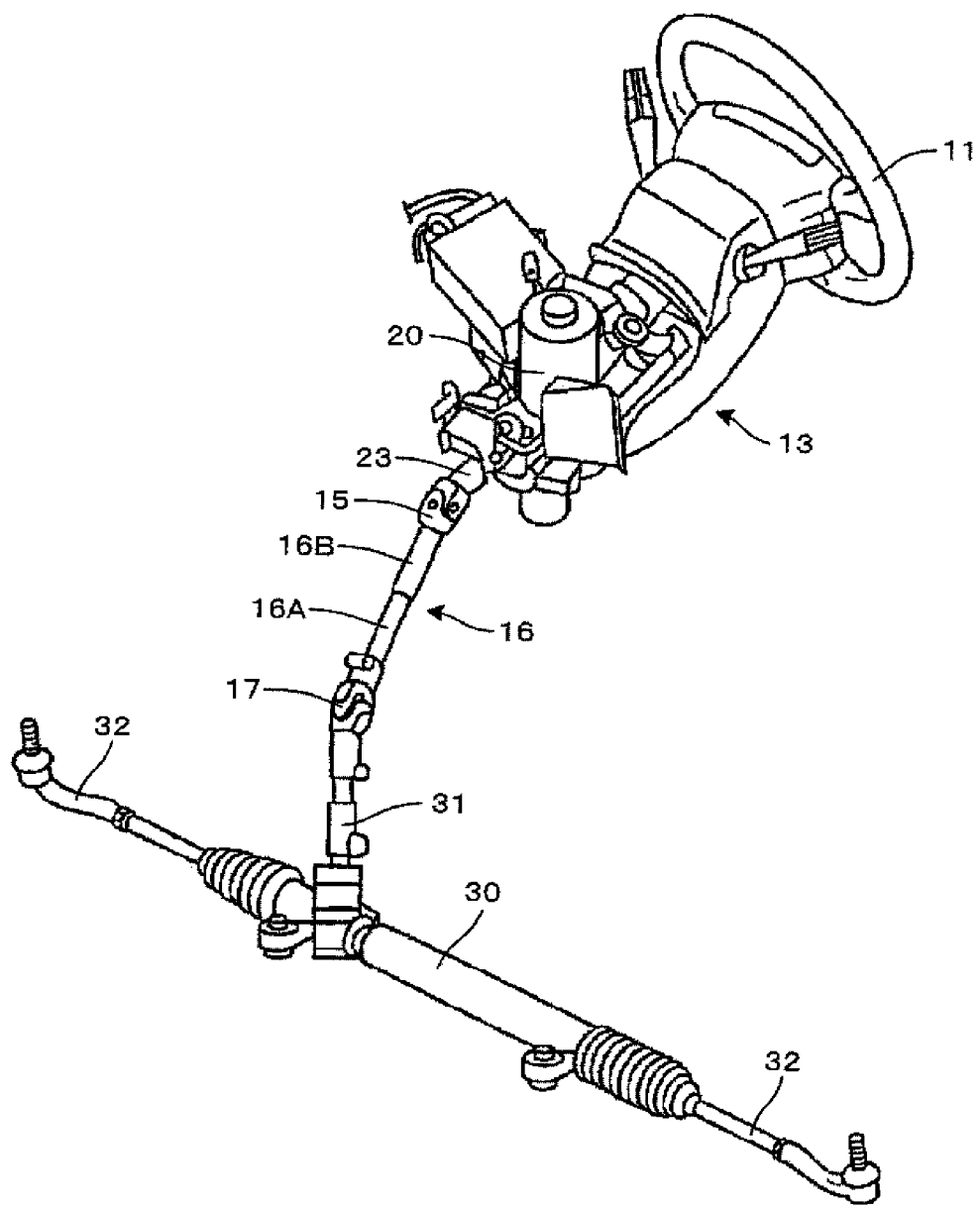
FIG. 1 is a perspective view of a steering apparatus.

FIG. 1 shows a rack-and-pinion type power steering apparatus of a column assist type as an example of a steering apparatus. This power steering apparatus includes a steering assistance portion 20 (an electric assistance device) for reducing a steering force of a steering wheel 11. The steering assistance portion 20 is attached to a column 13. A steering assistance force from the steering assistance portion 20 is applied to a steering shaft, and makes a rack of a steering gear 30 to reciprocate, through an intermediate shaft 16, thereby steering wheels through tie rods 32.

Figure 2:
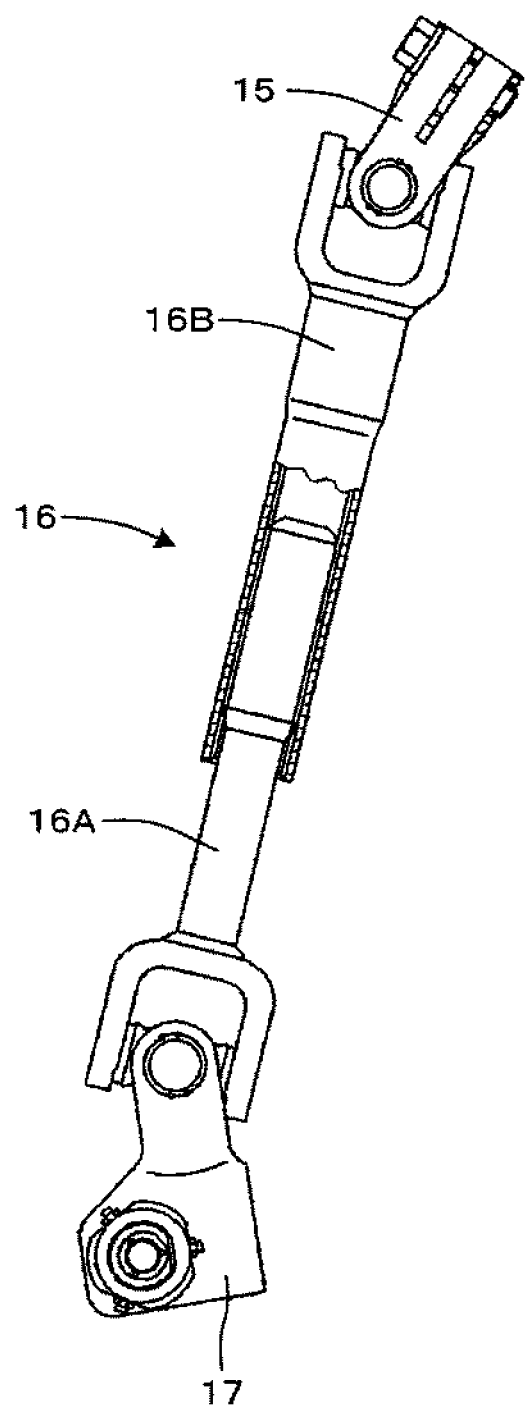
FIG. 2 is a side view of a telescopic shaft (an intermediate shaft) of the steering apparatus of FIG. 1, with a portion of the telescopic shaft notched.

As shown in FIGS. 1 and 2, an output shaft 23 protruding from the front end surface of the steering assistance portion 20 is connected to the rear end portion of a female intermediate shaft 16B (hereinafter, a female shaft) of the intermediate shaft 16 through a universal joint 15. The front end portion of a male intermediate shaft 16A (hereinafter, a male shaft) of the intermediate shaft 16 is connected to an input shaft 31 of the steering gear 30 through another universal joint 17. At the female shaft 16B, female splines are formed, and at the male shaft 16A, male splines are formed. The female shaft 16B and the male shaft 16A are spline-engaged.

The male shaft 16A is connected to be relatively slidable in an axial direction and be able to transmit rotational torque with respect to the female shaft 16B. At the front end portion of the input shaft 31, a pinion is formed. A rack is engaged with the pinion, such that rotation of the steering wheel 11 moves the tie rods 32, thereby steering vehicle wheels. The telescopic shaft according to the embodiment of the present invention is preferably applied to the intermediate shaft 16. However, it is possible to apply the telescopic shaft according to the embodiment of the present invention to any telescopic shafts of steering apparatuses.

Figure 3A:
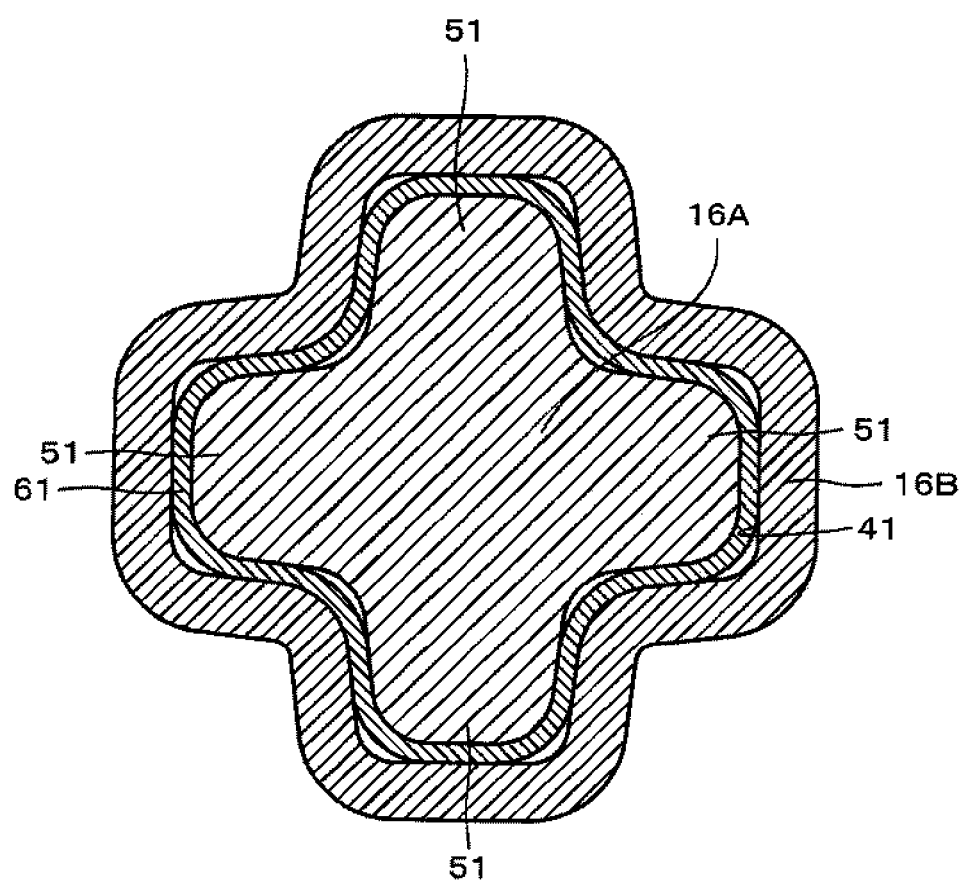
FIG. 3A is an enlarged sectional view of the telescopic shaft of FIG. 2, illustrating an example in which a male shaft of the telescopic shaft is covered with a sleeve.
Figure 3B:
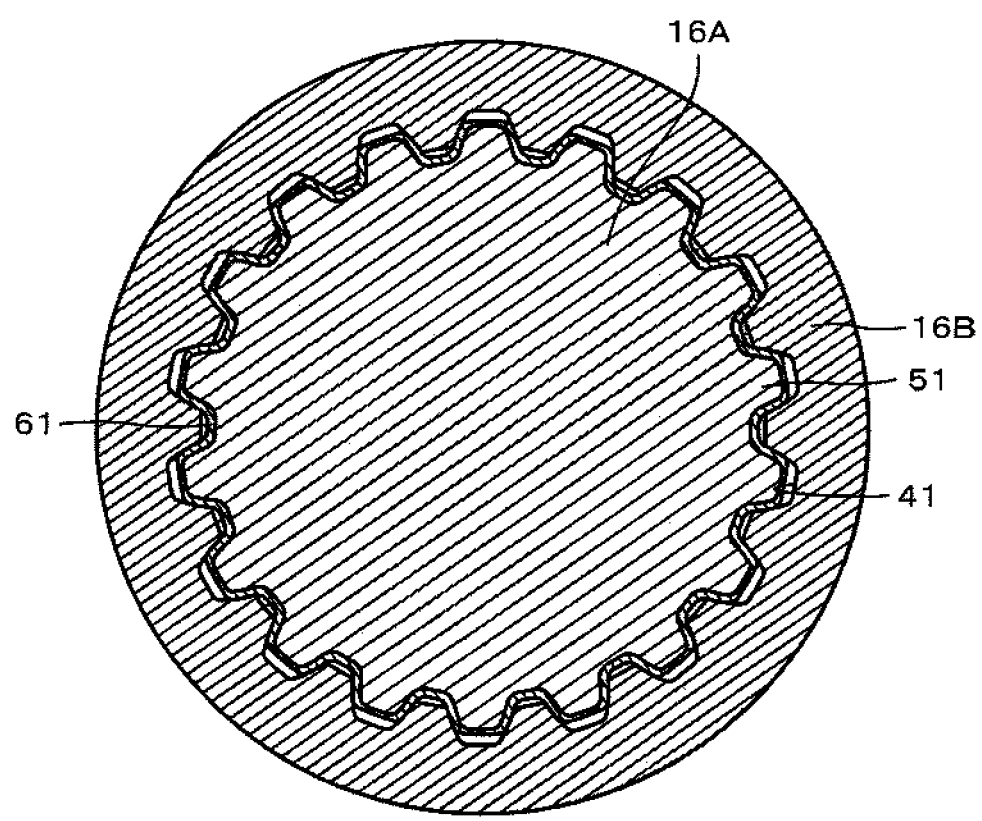
FIG. 3B is an enlarged sectional view of the telescopic shaft of FIG. 2, illustrating an example in which the male shaft of the telescopic shaft is coated with a covering portion.

As shown in FIGS. 2 to 3B, the female shaft 16B is formed in a hollow cylinder shape. At the inner circumference of the female shaft 16B, multiple axial tooth grooves 41 are formed radially from the shaft center of the female shaft 16B, at regular intervals, over the entire length of a telescopic range (a telescopic stroke). The male shaft 16A and the female shaft 16B are formed, for example, with carbon steel or an aluminum alloy.

FIG. 3A shows an example in which protruding teeth 51 of the male shaft 16A are covered with a sleeve. The sleeve is an example of a covering portion 61 which reduces sliding resistance between the protruding teeth 51 of the male shaft 16A and the tooth grooves 41 of the female shaft 16B.

The male shaft 16A has a non-circular outer circumference shape for transmitting rotational torque, and includes four protruding teeth 51 in the axial direction, and the protruding teeth 51 of the male shaft 16A are covered with the sleeve over the entire length of the protruding teeth 51 in the axial direction.

FIG. 3B shows an example in which the protruding teeth 51 of the male shaft 16A (the male spline shaft) are coated with a covering portion 61. The male shaft 16A has a non-circular outer circumference shape for transmitting rotational torque, and includes eighteen protruding teeth 51 in the axial direction. The protruding teeth 51 of the male shaft 16A are coated with the covering portion 61, over the entire length of the protruding teeth 51 in the axial direction, such that sliding resistance between the protruding teeth 51 and the tooth grooves 41 of the female shaft 16B (a female spline cylinder) in the axial direction is reduced. It is preferable to compose the covering portion 61 of rubber, for example, natural rubber, synthetic rubber, or a mixture of natural rubber and synthetic rubber. The present invention can be applied to a telescopic shaft including a male shaft and a female shaft which are relatively slidable, are able to transmit rotational torque, and have optional shapes.

Figure 4:
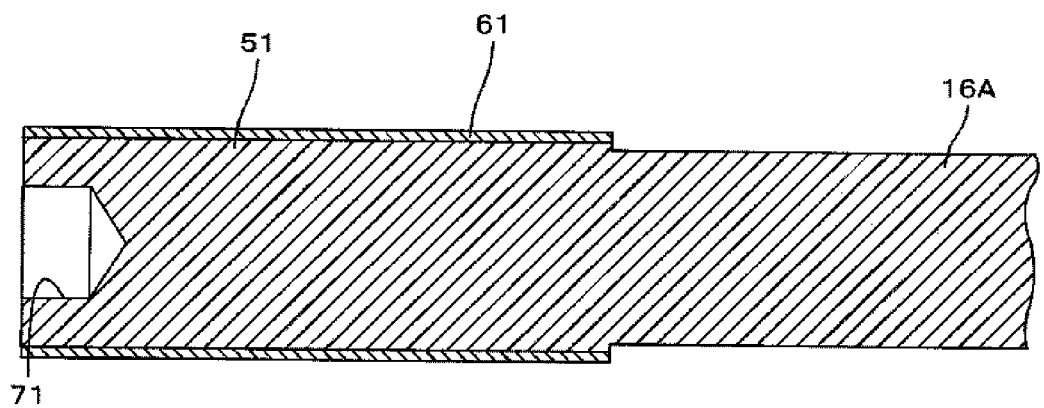
FIG. 4 is a cross-sectional view of a male shaft of a telescopic shaft according to a first embodiment of the present invention.

FIG. 4 is a cross-sectional view of a male shaft of a telescopic shaft according to a first embodiment of the present invention. As shown in FIG. 4, the male shaft 16A of the first embodiment is a solid shaft. On protruding teeth 51 of the male shaft 16A, a covering portion 61 for reducing sliding resistance between the protruding teeth 51 and tooth grooves 41 of a female shaft 16B is formed over the entire length of the protruding teeth 51 in the axial direction. In one end portion of the male shaft 16A corresponding to one end (left end in FIG. 4) of the protruding teeth 51 in the axial direction, a hole 71 is formed along the axial direction, such that the thickness of the one end portion of the male shaft 16A is smaller than the thickness of the other portion of the male shaft 16A. Therefore, the radial rigidity of the one end portion of the male shaft 16A in the axial range of the hole 71 is lower than the radial rigidity of the other portion of the male shaft 16A. The radial rigidity can be expressed as a radial force necessary to cause unit deformation in the radial direction.

As shown in FIG. 5, the male shaft 16A of FIG. 4 is fitted into the female shaft 16B such that a tooth surface of the tooth grooves 41 and the covering portion 61 have a little interference, and it is possible to relatively slide in the axial direction and transmit rotational torque. The fitting of the tooth surface of the tooth grooves 41 and the covering portion 61 is not limited to an interference fit, but may be a clearance fit or a sliding fit.

According to the telescopic shaft relative to the first embodiment, as shown in FIG. 5, even when large bending moments act on both end portions of an engagement region of the protruding teeth 51 and the tooth grooves 41 in the axial direction, an increase in a surface pressure on one end portion of the protruding teeth 51 in the axial direction is suppressed in the axial range of the hole 71, and deterioration of one end portion of the covering portion 61 in the axial direction and backlash between the male shaft 16A and the female shaft 16B are suppressed.

Second Embodiment

Next, a second embodiment of the present invention will be described with reference to FIG. 7A. Hereinafter, structure portions different from those of the above-described embodiment will be described, and the same structure portions as those of the above-described embodiment will not be described.

Figure 7A:
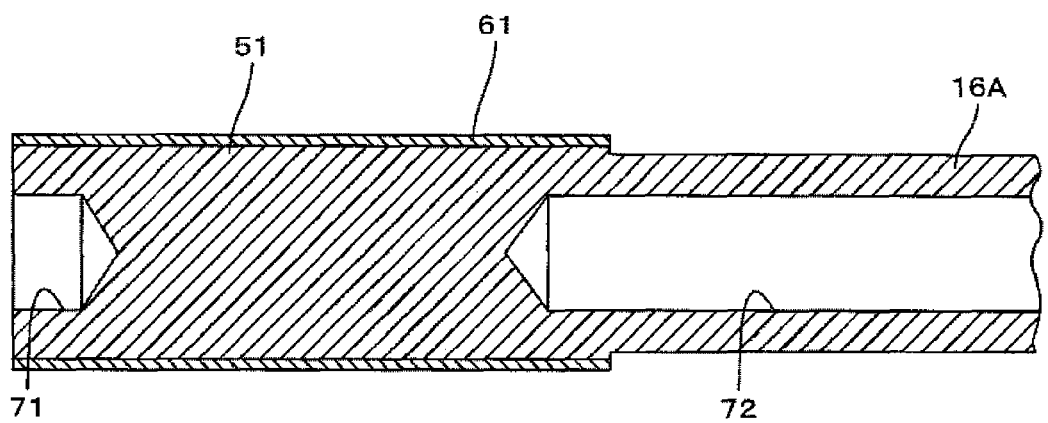
FIG. 7A is a cross-sectional view of a male shaft of a telescopic shaft according to a second embodiment of the present invention.

As shown in FIG. 7A, a male shaft 16A according to the second embodiment is a partially solid shaft. On protruding teeth 51 of the male shaft 16A, a covering portion 61 for reducing sliding resistance between the protruding teeth 51 and tooth grooves 41 of a female shaft 16B is formed over the entire length of the protruding teeth 51 in the axial direction. In one end portion of the male shaft 16A corresponding to one end (left end in FIG. 7A) of the protruding teeth 51 in the axial direction, a hole 71 is formed along the axial direction, whereby the thickness of the one end portion of the male shaft 16A is reduced.

Also, in the male shaft 16A, from the other end (right end in FIG. 7A) of the male shaft 16A to a portion of the male shaft 16A corresponding to the other end (right end of FIG. 7A) of the protruding teeth 51, a hole 72 is formed along the axial direction, whereby the thickness of the corresponding portion of the male shaft 16A is reduced. Therefore, the radial rigidity of portions of the male shaft 16A in the axial range of the hole 71 and the axial range of the hole 72 is lower than the radial rigidity of the other portion of the male shaft 16A. The diameter of the hole 72 may be the same as the diameter of the hole 71.

According to the telescopic shaft relative to the second embodiment, even when large bending moments act on both end portions of an engagement region of the protruding teeth 51 and the tooth grooves 41 in the axial direction, an increase in surface pressures on both end portions of the protruding teeth 51 in the axial direction is suppressed in the axial range of the hole 71 and the axial range of the hole 72, and deterioration of both end portions of the covering portion 61 in the axial direction and backlash between the male shaft 16A and the female shaft 16B are suppressed.

Third Embodiment

Next, a third embodiment of the present invention will be described with reference to FIG. 7B. Hereinafter, structure portions different from those of the above-described embodiments will be described, and the same structure portions as those of the above-described embodiments will not be described.

Figure 7B:
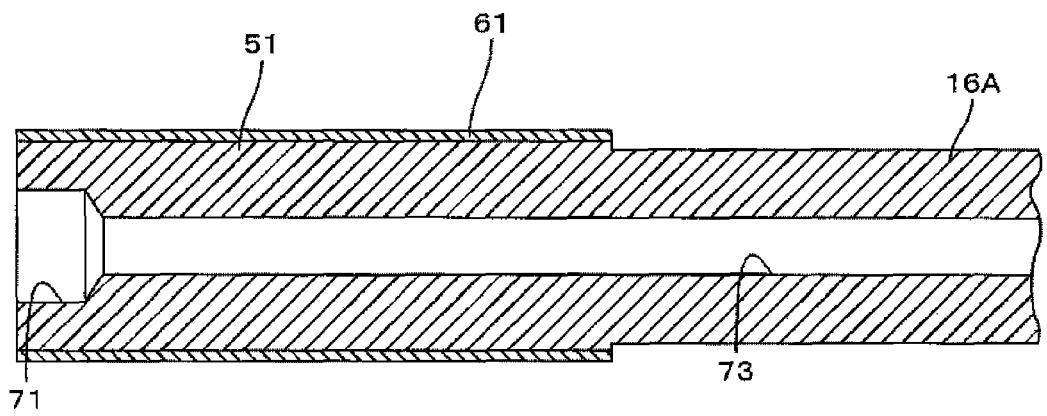
FIG. 7B is a cross-sectional view of a male shaft of a telescopic shaft according to a third embodiment of the present invention.

As shown in FIG. 7B, a male shaft 16A according to the third embodiment is a hollow shaft having a hole 73 formed over the entire length of the male shaft 16A in the axial direction. On protruding teeth 51 of the male shaft 16A, a covering portion 61 for reducing sliding resistance between the protruding teeth 51 and tooth grooves 41 of a female shaft 16B is formed over the entire length of the protruding teeth 51 in the axial direction. In one end portion of the male shaft 16A corresponding to one end (left end in FIG. 7A) of the protruding teeth 51 in the axial direction, the hole 73 is expanded such that a hole 71 is formed, whereby the thickness of the one end portion of the male shaft 16A is reduced. In other words, the inside diameter of the one end portion of the male shaft 16A is larger than the inside diameter of the other portion of the male shaft 16A.

Therefore, the radial rigidity of the one end portion of the male shaft 16A in the axial range of the hole 71 is lower than the radial rigidity of the other portion of the male shaft 16A. According to the telescopic shaft relative to the third embodiment, even when large bending moments act on both end portions of an engagement region of the protruding teeth 51 and the tooth grooves 41 in the axial direction, an increase in a surface pressure on one end portion of the protruding teeth 51 in the axial direction is suppressed in the axial range of the hole 71, and deterioration of one end portion of the covering portion 61 in the axial direction and backlash between the male shaft 16A and the female shaft 16B are suppressed.

Fourth Embodiment

Next, a fourth embodiment of the present invention will be described with reference to FIG. 8A. Hereinafter, structure portions different from those of the above-described embodiments will be described, and the same structure portions as those of the above-described embodiments will not be described.

Figure 8A:
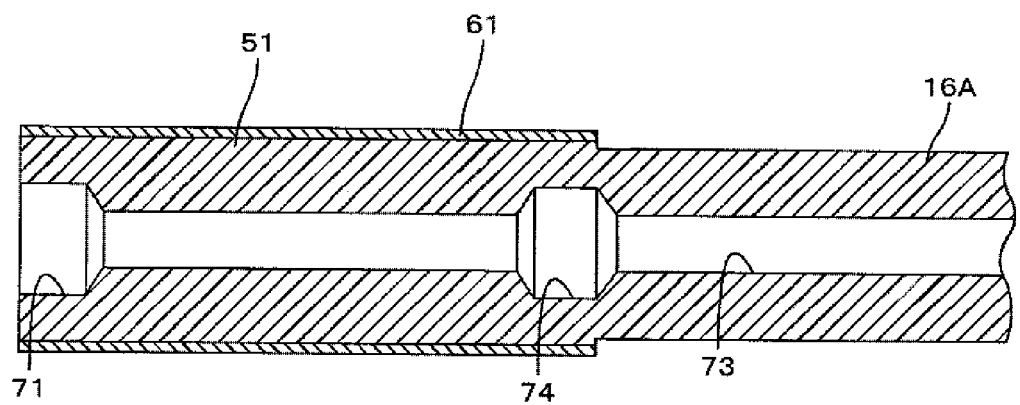
FIG. 8A is a cross-sectional view of a male shaft of a telescopic shaft according to a fourth embodiment of the present invention.

As shown in FIG. 8A, a male shaft 16A according to the fourth embodiment is a hollow shaft having a hole 73 formed over the entire length of the male shaft 16A in the axial direction. On protruding teeth 51 of the male shaft 16A, a covering portion 61 for reducing sliding resistance between the protruding teeth 51 and tooth grooves 41 of a female shaft 16B is formed over the entire length of the protruding teeth 51 in the axial direction. Similarly to the third embodiment, in one end portion of the male shaft 16A corresponding to one end (left end in FIG. 8A) of the protruding teeth 51 in the axial direction, the hole 73 is expanded such that a hole 71 is formed, whereby the thickness of the one end portion of the male shaft 16A is reduced.

Also, in a portion of the male shaft 16A corresponding to the other end (right end in FIG. 8A) of the protruding teeth 51 in the axial direction, the hole 73 is expanded such that a hole 74 is formed, whereby the thickness of the corresponding portion of the male shaft 16A is reduced. In other words, the inside diameters of the portions of the male shaft 16A corresponding to both ends of the protruding teeth 51 in the axial direction are larger than the inside diameter of the other portion of the male shaft 16A. Therefore, the radial rigidity of the portions of the male shaft 16A in the axial range of the hole 71 and the axial range of the hole 74 is lower than the radial rigidity of the other portion of the male shaft 16A. According to the telescopic shaft relative to the fourth embodiment, even when large bending moments act on both end portions of an engagement region of the protruding teeth 51 and the tooth grooves 41 in the axial direction, surface pressures on both end portions of the protruding teeth 51 in the axial direction are suppressed in the axial range of the hole 71 and the axial range of the hole 74, and deterioration of both end portions of the covering portion 61 in the axial direction and backlash between the male shaft 16A and the female shaft 16B are suppressed.

Fifth Embodiment

Next, a fifth embodiment of the present invention will be described with reference to FIG. 8B. Hereinafter, structure portions different from those of the above-described embodiments will be described, and the same structure portions as those of the above-described embodiments will not be described.

Figure 8B:
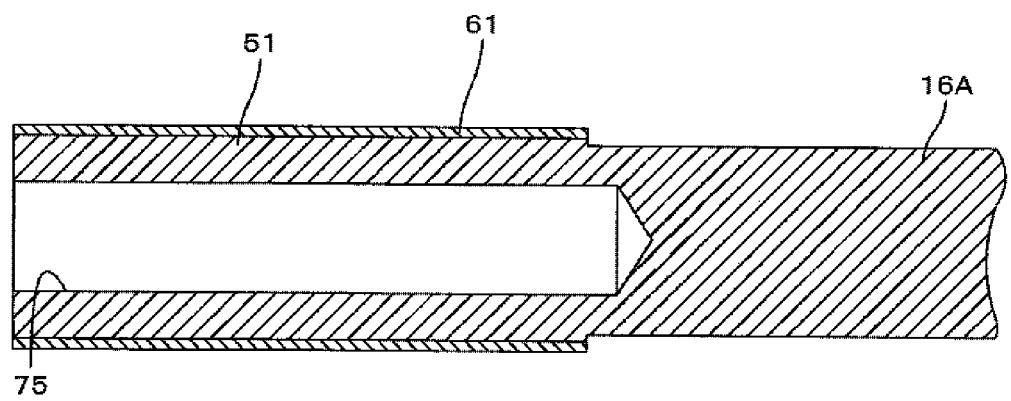
FIG. 8B is a cross-sectional view of a male shaft of a telescopic shaft according to a fifth embodiment of the present invention.

As shown in FIG. 8B, a male shaft 16A according to the fifth embodiment is a partially solid shaft. On protruding teeth 51 of the male shaft 16A, a covering portion 61 for reducing sliding resistance between the protruding teeth 51 and tooth grooves 41 of a female shaft 16B is formed over the entire length of the protruding teeth 51 in the axial direction. In the male shaft 16A, a hole 75 is formed over the entire length of the protruding teeth 51 in the axial direction, whereby the thickness of the male shaft 16A is reduced over the entire axial range of the protruding teeth 51.

Therefore, the radial rigidity of the portion of the male shaft 16A in the entire axial range of the protruding teeth 51 is lower than the radial rigidity of the other portion of the male shaft 16A. According to the telescopic shaft relative to the fifth embodiment, even when large bending moments act on both end portions of an engagement region of the protruding teeth 51 and the tooth grooves 41 in the axial direction, an increase in a surface pressure on the entire protruding teeth 51 is suppressed, and deterioration of the covering portion 61 and backlash between the male shaft 16A and the female shaft 16B are suppressed.

Sixth Embodiment

Next, a sixth embodiment of the present invention will be described with reference to FIGS. 9 and 10. Hereinafter, structure portions different from those of the above-described embodiments will be described, and the same structure portions as those of the above-described embodiments will not be described.

Figure 9:
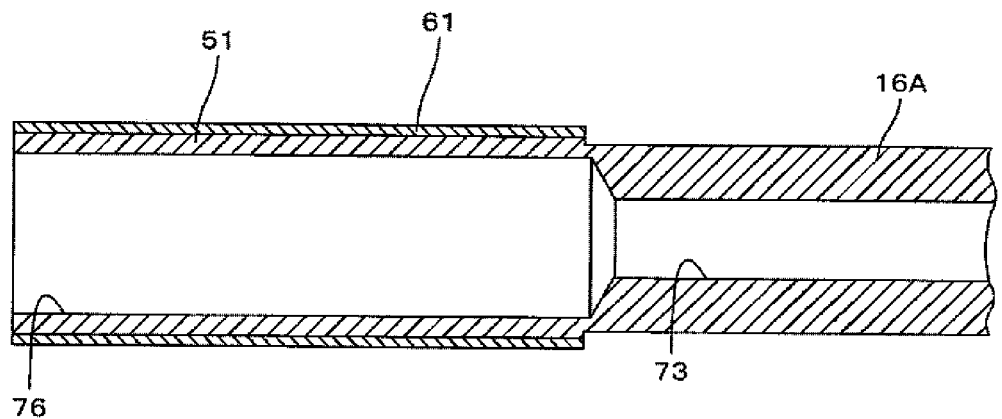
FIG. 9 is a cross-sectional view of a male shaft of a telescopic shaft according to a sixth embodiment of the present invention.
Figure 10:
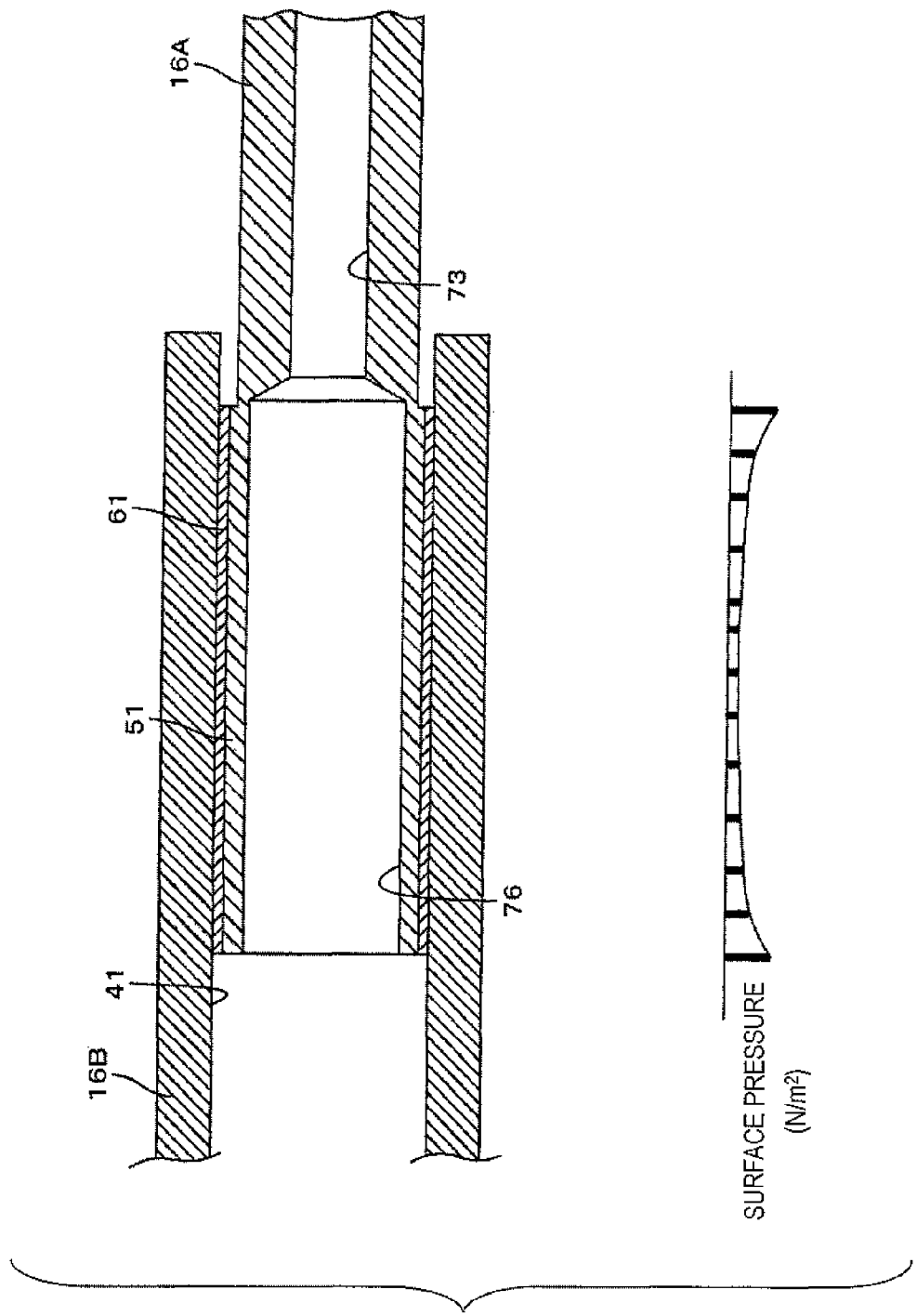
FIG. 10 is a cross-sectional view of the male shaft of FIG. 9 and a female shaft fitted onto the male shaft, illustrating a surface pressure applied to a covered portion of the male shaft.

As shown in FIG. 9, a male shaft 16A according to the sixth embodiment is a hollow shaft having a hole 73 formed over the entire length of the male shaft 16A in the axial direction. On protruding teeth 51 of the male shaft 16A, a covering portion 61 for reducing sliding resistance between the protruding teeth 51 and tooth grooves 41 of a female shaft 16B is formed over the entire length of the protruding teeth 51 in the axial direction. In the male shaft 16A, the hole 73 is expanded over the entire length of the protruding teeth 51 in the axial direction such that a hole 76 is formed, whereby the thickness of the male shaft 16A is reduced over the entire axial range of the protruding teeth 51. In other words, the inside diameter of the portion of the male shaft 16A in the entire axial range of the protruding teeth 51 is larger than the inside diameter of the other portion of the male shaft 16A.

Therefore, the radial rigidity of the portion of the male shaft 16A in the axial range of the hole 76 is lower than the radial rigidity of the other portion of the male shaft 16A. According to the telescopic shaft relative to the sixth embodiment, even when large bending moments act on both end portions of an engagement region of the protruding teeth 51 and the tooth grooves 41 in the axial direction, as shown in FIG. 10, an increase in a surface pressure on the entire protruding teeth 51 is suppressed, and deterioration of the covering portion 61 and backlash between the male shaft 16A and the female shaft 16B are suppressed.

Seventh Embodiment

Next, a seventh embodiment of the present invention will be described with reference to FIG. 11. Hereinafter, structure portions different from those of the above-described embodiments will be described, and the same structure portions as those of the above-described embodiments will not be described.

Figure 11:
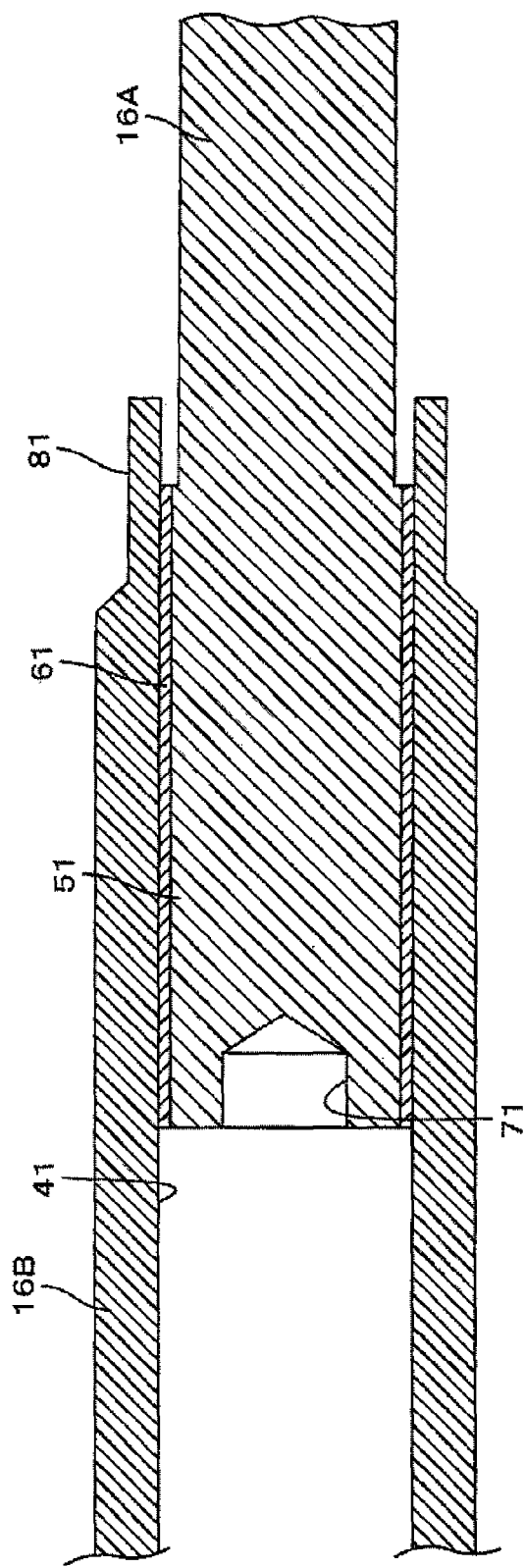
FIG. 11 is a cross-sectional view of a telescopic shaft according to a seventh embodiment of the present invention.

As shown in FIG. 11, a male shaft 16A according to the seventh embodiment is a solid shaft having the same configuration as that of the first embodiment. In other words, in one end portion of the male shaft 16A corresponding to one end (left end in FIG. 11) of protruding teeth 51 of the male shaft 16A in an axial direction, a hole 71 is formed along the axial direction, whereby the thickness of the one end portion of the male shaft 16A is reduced.

Also, at a female shaft 16B, the outside diameter of one end portion of the female shaft 16B corresponding to one end of tooth grooves 41 in the axial direction is reduced such that a small-diameter portion 81 is formed, whereby the thickness of the one end portion of the female shaft 16B is reduced. Therefore, the radial rigidity of one end portion of the male shaft 16A in the axial range of the hole 71 is lower than the radial rigidity of the other portion of the male shaft 16A, and the radial rigidity of one end portion of the female shaft 16B in the axial range of the small-diameter portion 81 is lower than the radial rigidity of the other portion of the female shaft 16B.

According to the telescopic shaft relative to the seventh embodiment, even when large bending moments act on both end portions of an engagement region of the protruding teeth 51 and the tooth grooves 41 in the axial direction, an increase in surface pressures on both end portions of the protruding teeth 51 in the axial direction is suppressed in the axial range of the hole 71 and the axial range of the small-diameter portion 81, and deterioration of both end portions of the covering portion 61 in the axial direction and backlash between the male shaft 16A and the female shaft 16B are suppressed.

Eighth Embodiment

Next, an eighth embodiment of the present invention will be described with reference to FIG. 12. Hereinafter, structure portions different from those of the above-described embodiments will be described, and the same structure portions as those of the above-described embodiments will not be described.

Figure 12:
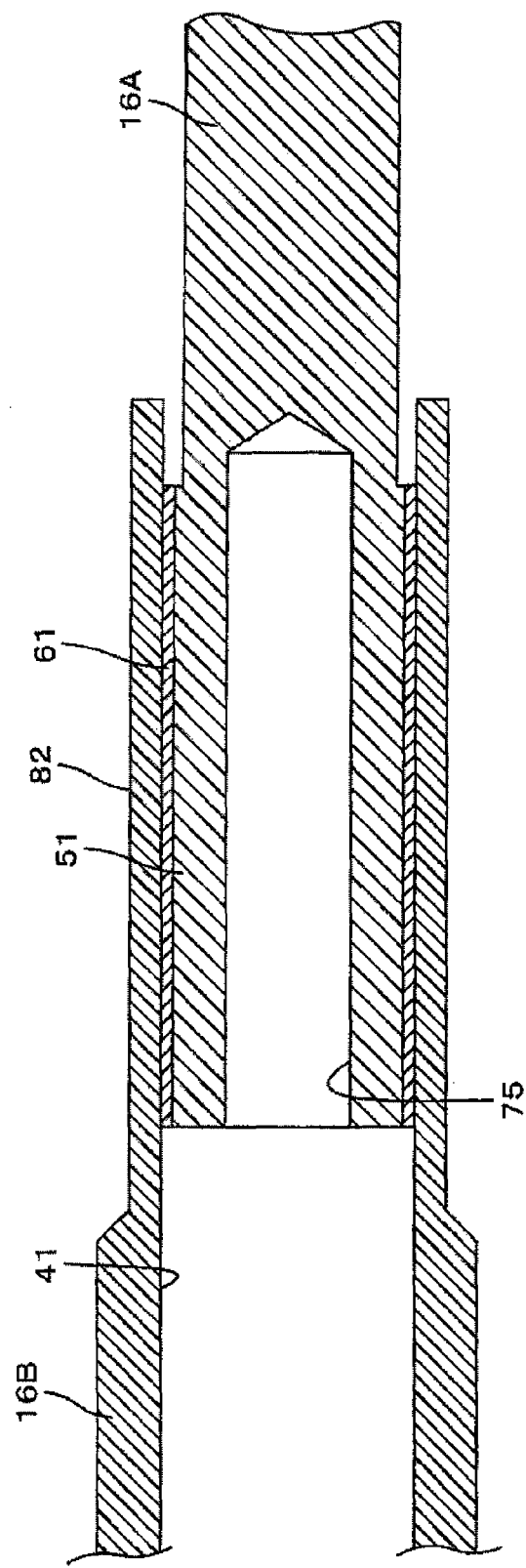
FIG. 12 is a cross-sectional view of a telescopic shaft according to an eighth embodiment of the present invention.

As shown in FIG. 12, a male shaft 16A according to the eighth embodiment is a partially solid shaft and has the same configuration as that of the fifth embodiment. With respect to the protruding teeth 51 of the male shaft 16A, a hole 75 is formed along the entire length of the protruding teeth 51 in an axial direction, whereby the thickness of the male shaft 16A is reduced over the entire axial range of the protruding teeth 51.

Also, in a female shaft 16B, the outside diameter of the female shaft 16B is reduced over the entire length of tooth grooves 41 in the axial direction such that a small-diameter portion 82 is formed, whereby the thickness of the female shaft 16B is reduced over the entire axial range of the tooth grooves 41. Therefore, the radial rigidity of the portion of the male shaft 16A in the entire axial range of the protruding teeth 51 (the axial range of the hole 75) is lower than the radial rigidity of the other portion of the male shaft 16A in the axial direction, and the radial rigidity of a portion of the female shaft 16B in the entire axial range of the tooth grooves 41 (the axial range of the small-diameter portion 82) is lower than the radial rigidity of the other portion of the entire axial length of the female shaft 16B.

According to the telescopic shaft of the eighth embodiment, even when large bending moments act on both end portions of an engagement region of the protruding teeth 51 and the tooth grooves 41 in the axial direction, an increase in a surface pressure on the entire protruding teeth 51 is suppressed, and deterioration of a covering portion 61 and backlash between the male shaft 16A and the female shaft 16B are suppressed.

Ninth Embodiment

Next, a ninth embodiment of the present invention will be described with reference to FIG. 13. Hereinafter, structure portions different from those of the above-described embodiments will be described, and the same structure portions as those of the above-described embodiments will not be described.

Figure 13:
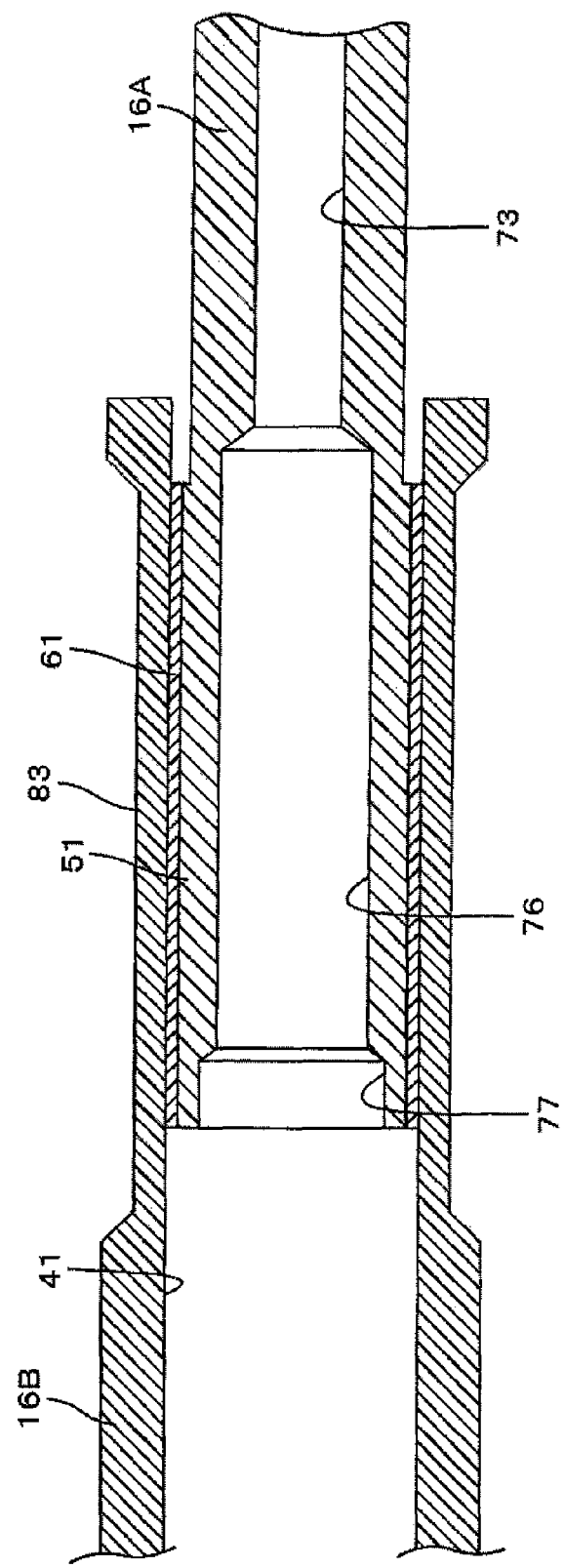
FIG. 13 is a cross-sectional view of a telescopic shaft according to a ninth embodiment of the present invention.

As shown in FIG. 13, a male shaft 16A according to the ninth embodiment is a hollow shaft having a hollow hole 73 formed along the entire length of the male shaft 16A in an axial direction. In the male shaft 16A, the hole 73 is expanded over the entire length of protruding teeth 51 in the axial direction such that a hole 76 is formed, whereby the thickness of the male shaft 16A is reduced in the entire axial range of the protruding teeth 51. Further, in one end portion of the male shaft 16A corresponding to one end (left end in FIG. 13) of the protruding teeth 51 in the axial direction, the hole 76 is expanded such that a hole 77 is formed, whereby the thickness of the one end portion of the male shaft 16A is further reduced. In other words, the inside diameter of one end portion of the male shaft 16A corresponding to one end of the protruding teeth 51 in the axial direction is larger than the outside diameter of the other portion of the male shaft 16A in the axial range of the protruding teeth 51, and the inside diameter of the other portion of the male shaft 16A in the axial range of the protruding teeth 51 is larger than the inside diameter beyond the axial range of the protruding teeth 51.

Also, in a female shaft 16B, the outside diameter of a portion of the female shaft 16B corresponding to a portion of tooth grooves 41 other than one end (right end in FIG. 9) of the tooth grooves 41 in the axial direction is reduced such that a small-diameter portion 83 is formed, whereby the thickness of the corresponding portion of the female shaft 16B is reduced. Therefore, the radial rigidity of the portion of the male shaft 16A in the axial range of the hole 76, particularly, the radial rigidity of the portion of the male shaft 16A in the axial range of the hole 77 is lower than the radial rigidity of the other portion of the male shaft 16A, and the radial rigidity of the portion of the female shaft 16B in the axial range of the small-diameter portion 83 is lower than the radial rigidity of the other portion of the female shaft 16B in the axial direction.

According to the telescopic shaft of the ninth embodiment, even when large bending moments act on both end portions of an engagement region of the protruding teeth 51 and the tooth grooves 41 in the axial direction, an increase in a surface pressure on the entire protruding teeth 51 is suppressed, and deterioration of a covering portion 61 and backlash between the male shaft 16A and the female shaft 16B are suppressed.

Tenth Embodiment

Next, a tenth embodiment of the present invention will be described with reference to FIG. 14. Hereinafter, structure portions different from those of the above-described embodiments will be described, and the same structure portions as those of the above-described embodiments will not be described.

Figure 14:
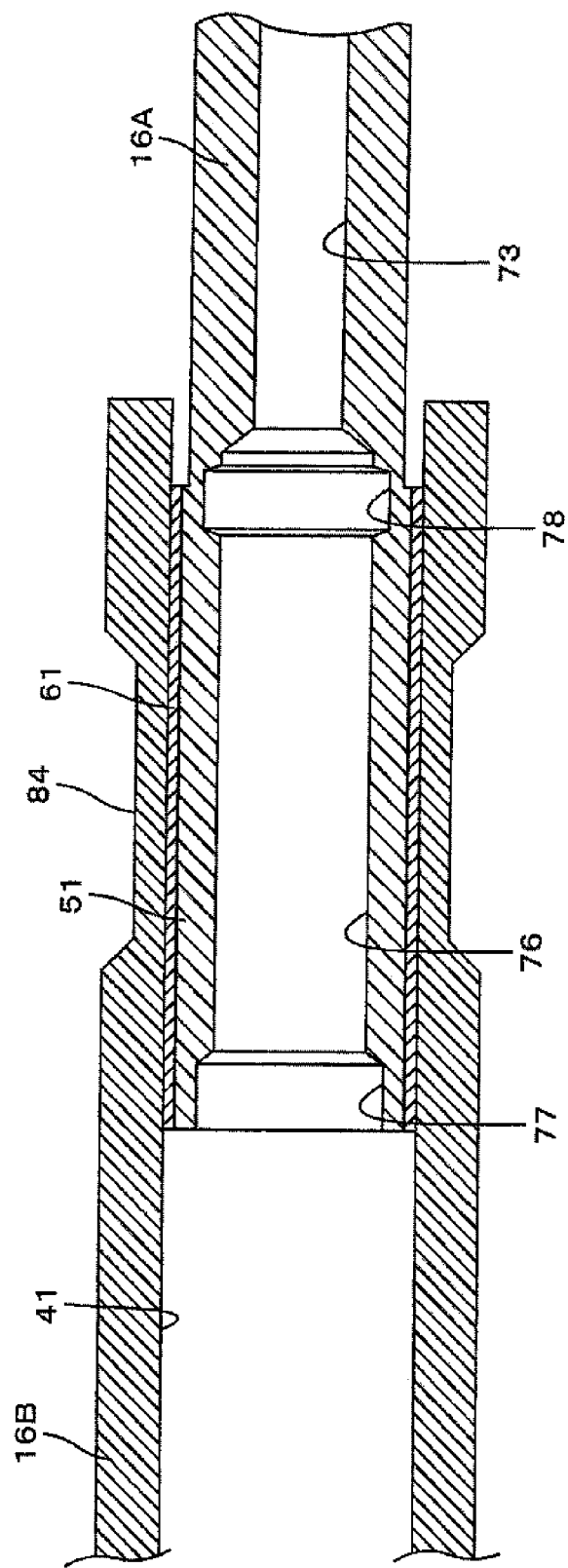
FIG. 14 is a cross-sectional view of a telescopic shaft according to a tenth embodiment of the present invention.

As shown in FIG. 14, a male shaft 16A according to the tenth embodiment is a hollow shaft having a hollow hole 73 formed along the entire length of the male shaft 16A in an axial direction. In the male shaft 16A, the hole 73 is expanded over the entire length of protruding teeth 51 in the axial direction such that a hole 76 is formed, whereby the thickness of the male shaft 16A is reduced in the entire axial range of the protruding teeth 51. Further, in one end portion of the male shaft 16A corresponding to one end (left end in FIG. 14) of the protruding teeth 51 in the axial direction, the hole 76 is expanded such that a hole 77 is formed, whereby the thickness of the one end portion of the male shaft 16A is further reduced. Also, even in a portion of the male shaft 16A corresponding to the other end (right end in FIG. 14) of the protruding teeth 51 in the axial direction, the hole 76 is expanded such that a hole 78 is formed, whereby the thickness of the corresponding portion of the male shaft 16A is further reduced.

Also, in a female shaft 16B, the outside diameter of a portion of the female shaft 16B corresponding to an intermediate portion of tooth grooves 41 in the axial direction is reduced such that a small-diameter portion 84 is formed, whereby the thickness of the corresponding portion of the female shaft 16B is reduced. Therefore, the radial rigidity of the portions of the male shaft 16A in the axial range of the hole 76, the axial range of the hole 77, and the axial range of the hole 78 are lower than the radial rigidity of the other portion of the male shaft 16A, and the radial rigidity of the portion of the female shaft 16B in the axial range of the small-diameter portion 84 is lower than the radial rigidity of the other portion of the female shaft 16B.

According to the telescopic shaft relative to the tenth embodiment, even when large bending moments act on both end portions of an engagement region of the protruding teeth 51 and the tooth grooves 41 in the axial direction, an increase in surface pressures on both end portions and intermediate portion of the protruding teeth 51 in the axial direction is suppressed, and deterioration of a covering portion 61 and backlash between the male shaft 16A and the female shaft 16B are suppressed.

Eleventh Embodiment

Next, an eleventh embodiment of the present invention will be described with reference to FIG. 15. Hereinafter, structure portions different from those of the above-described embodiments will be described, and the same structure portions as those of the above-described embodiments will not be described.

Figure 15:
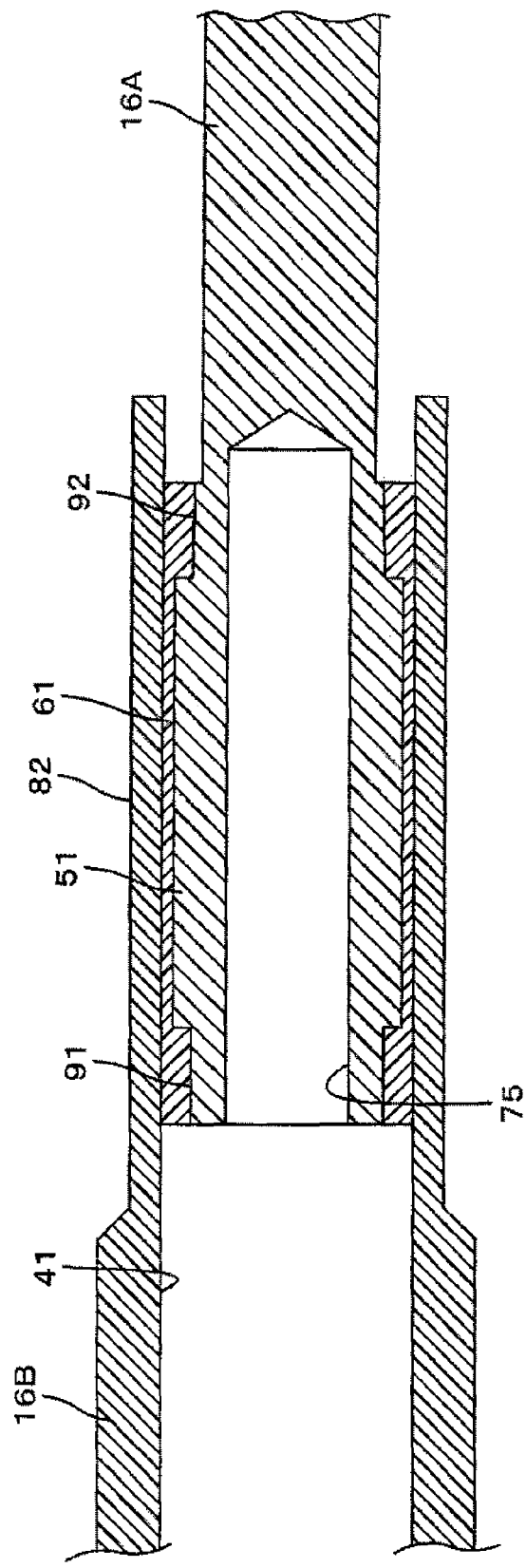
FIG. 15 is a cross-sectional view of a telescopic shaft according to an eleventh embodiment of the present invention.

As shown in FIG. 15, a male shaft 16A according to the eleventh embodiment is a partially solid shaft. In the male shaft 16A, a hole 75 is formed over the entire length of protruding teeth 51 in the axial direction such that the thickness of the male shaft 16A is reduced over the entire axial range of the protruding teeth 51. Further, in the male shaft 16A, the outside diameter of one end portion of the male shaft 16A corresponding to one end (left end in FIG. 15) of the protruding teeth 51 in an axial direction, and the outside diameter of a portion of the male shaft 16A corresponding to the other end (right end in FIG. 15) of the protruding teeth 51 in the axial direction are reduced such that small-diameter portions 91 and 92 are formed, whereby the thicknesses of the portions of the male shaft 16A corresponding to both end portions of the protruding teeth 51 in the axial direction are reduced.

Also, in a female shaft 16B, the outside diameter of the female shaft 16B is reduced over the entire length of tooth grooves 41 in the axial direction such that a small-diameter portion 82 is formed, whereby the thickness of the female shaft 16B is reduced in the entire range of the tooth grooves 41 in the axial direction. Therefore, the radial rigidity of the portions of the male shaft 16A in the axial range of the small-diameter portion 91 and the axial range of the small-diameter portion 92 is lower than that of the male shaft 16A, and the radial rigidity of the portion of the female shaft 16B in the axial range of the small-diameter portion 82 is lower than the radial rigidity of the other portion of the female shaft 16B.

According to the telescopic shaft relative to the eleventh embodiment, even when large bending moments act on both end portions of an engagement region of the protruding teeth 51 and the tooth grooves 41 in the axial direction, an increase in a surface pressure on the entire protruding teeth 51 is suppressed, and deterioration of a covering portion 61 and backlash between the male shaft 16A and the female shaft 16B are suppressed.

Twelfth Embodiment

Next, a twelfth embodiment of the present invention will be described with reference to FIG. 16. Hereinafter, structure portions different from those of the above-described embodiments will be described, and the same structure portions as those of the above-described embodiments will not be described.

Figure 16:
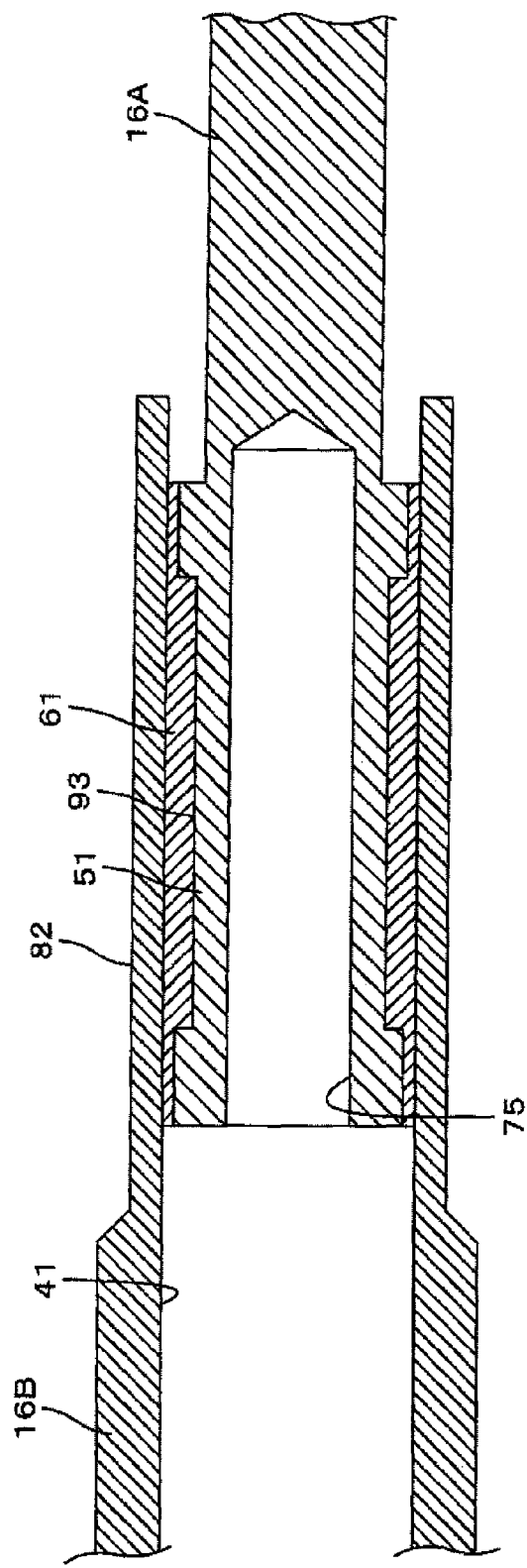
FIG. 16 is a cross-sectional view of a telescopic shaft according to a twelfth embodiment of the present invention.

As shown in FIG. 16, a male shaft 16A according to the twelfth embodiment is a partially solid shaft. In the male shaft 16A, a hole 75 is formed over the entire length of protruding teeth 51 in an axial direction, whereby the thickness of the male shaft 16A is reduced over the entire axial range of the protruding teeth 51. Further, in the male shaft 16A, the outside diameter of a portion of the male shaft 16A corresponding to an intermediate portion of the protruding teeth 51 in the axial direction is reduced such that a small-diameter portion 93 is formed, whereby the thickness of the corresponding portion of the male shaft 16A is reduced.

Also, in a female shaft 16B, the outside diameter of the female shaft 16B is reduced over the entire length of tooth grooves 41 in the axial direction such that a small-diameter portion 82 is formed, whereby the thickness of the female shaft 16B is reduced in the entire range of the tooth grooves 41 in the axial direction. Therefore, the radial rigidity of the portion of the male shaft 16A in the axial range of the small-diameter portion 93 is lower than the radial rigidity of the other portion of the male shaft 16A, and the radial rigidity of the portion of the female shaft 16B in the axial range of the small-diameter portion 82 is lower than the radial rigidity of the other portion of the female shaft 16B.

According to the telescopic shaft relative to the twelfth embodiment, even when large bending moments act on both end portions of an engagement region of the protruding teeth 51 and the tooth grooves 41 in the axial direction, an increase in a surface pressure on the entire protruding teeth 51 is suppressed, and deterioration of the covering portion 61 and backlash between the male shaft 16A and the female shaft 16B are suppressed.

Thirteenth Embodiment

Next, a thirteenth embodiment of the present invention will be described with reference to FIG. 17. Hereinafter, structure portions different from those of the above-described embodiments will be described, and the same structure portions as those of the above-described embodiments will not be described.

Figure 17:
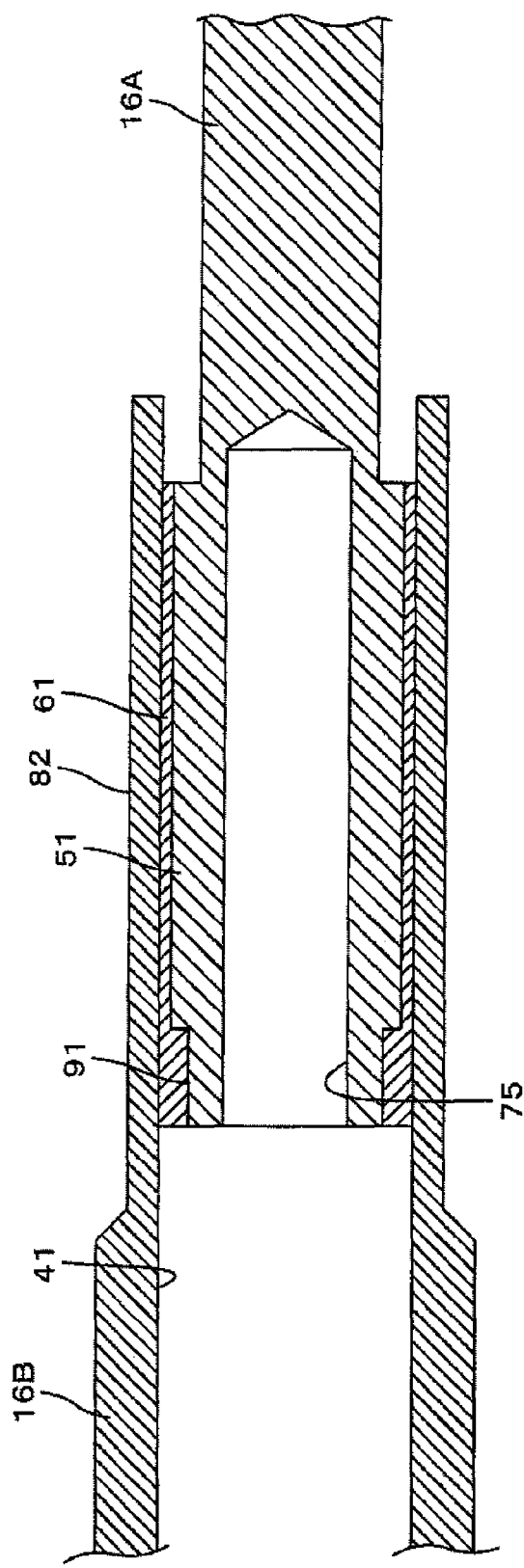
FIG. 17 is a cross-sectional view of a telescopic shaft according to a thirteenth embodiment of the present invention.

As shown in FIG. 17, a male shaft 16A according to the eleventh embodiment is a partially solid shaft. In the male shaft 16A, a hole 75 is formed over the entire length of protruding teeth 51 in the axial direction, whereby the thickness of the male shaft 16A is reduced over the entire axial range of the protruding teeth 51. Further, in the male shaft 16A, the outside diameter of one end portion of the male shaft 16A corresponding to one end (left end in FIG. 17) of the protruding teeth 51 in an axial direction is reduced such that a small-diameter portion 91 is formed, whereby the thickness of the one end portion of the male shaft 16A is reduced.

Also, in a female shaft 16B, the outside diameter of the female shaft 16B is reduced over the entire length of tooth grooves 41 in the axial direction such that a small-diameter portion 82 is formed, whereby the thickness of the female shaft 16B is reduced in the entire range of the tooth grooves 41 in the axial direction. Therefore, the radial rigidity of one end portion of the male shaft 16A in the axial range of the small-diameter portion 91 is lower than the radial rigidity of the other portion of the male shaft 16A, and the radial rigidity of the portion of the female shaft 16B in the axial range of the small-diameter portion 82 is lower than the radial rigidity of the other portion of the female shaft 16B.

According to the telescopic shaft relative to the thirteenth embodiment, even when large bending moments act on both end portions of an engagement region of the protruding teeth 51 and the tooth grooves 41 in the axial direction, an increase in a surface pressure on the entire protruding teeth 51 is suppressed, and deterioration of a covering portion 61 and backlash between the male shaft 16A and the female shaft 16B are suppressed. The small-diameter portions 91 to 93 of the above-described eleventh to third embodiments may be formed, for example, in hollow male shafts 16A as shown in FIG. 9.

Although examples in which the present invention was applied to telescopic shafts having splines have been described in the above-described embodiments, the present invention may be applied to telescopic shafts having serration. In the above-described embodiments, the covering portion 61 for reducing sliding resistance is formed on the protruding teeth 51 of the male shaft 16A. However, a covering portion 61 may be formed on the tooth grooves 41 of the female shaft 16B. Also, on the protruding teeth 51 of the male shaft 16A and on the tooth grooves 41 of the female shaft 16B, covering portions 61 may be formed. Also, the entire male shaft 16A or female shaft 16B may be formed with the same material as that of the covering portion 61. Alternatively, on any of the male shaft 16A and the female shaft 16B, a covering portion 61 may not be formed.

Also, although examples in which the present invention was applied to the intermediate shaft 16 have been described in the above-described embodiments, the present invention can be applied to any telescopic shafts, such as a steering shaft, forming steering apparatuses. Also, although examples in which the present invention was applied to the steering apparatus having the electric assistance device 20 have been described in the above-described embodiments, the present invention can be applied to steering apparatuses with no electric assistance devices.

This application is based on Japanese Patent Application No. 2011-263121 filed on Nov. 30, 2011, the entire content of which is incorporated herein by reference.

INDUSTRIAL APPLICABILITY

The present invention is applicable to a telescopic shaft including a male shaft and a female shaft which are relatively slidable and can transmit rotational torque.

DESCRIPTION OF REFERENCE NUMERALS AND SIGNS

16 Intermediate Shaft
16A Male Intermediate Shaft (Male Shaft)
16B Female Intermediate Shaft (Female Shaft)
41 Tooth Groove
51 Protruding Tooth
61 Covering Portion
71-78 Hole
81-84, 91-93 Small-Diameter Portion

The invention claimed is:

1. A telescopic shaft comprising:
a male shaft having an outer circumference on which a plurality of protruding teeth are formed, wherein the male shaft is at least partially a solid shaft, and wherein the portion of the male shaft corresponding to both ends of the protruding teeth in the axial direction is formed with a hole along the axial direction; and
a female shaft having an inner circumference on which a plurality of tooth grooves are formed,
wherein the female shaft includes a small-diameter portion in an entire axial range of the tooth grooves, and an outside diameter of the small-diameter portion is smaller than an outside diameter of the other portion of the female shaft in the entire axial range of the tooth grooves, the female shaft being fitted onto the male shaft,
wherein the protruding teeth and the tooth grooves are engaged with each other such that the male shaft and the female shaft are relatively slidable in an axial direction and such that a rotational torque is transmittable between the male shaft and the female shaft, and
wherein at least one of the male shaft and the female shaft is configured such that a radial rigidity of a portion of the at least one of the male shaft and the female shaft in an axial range of a region where the protruding teeth and the tooth grooves are engaged with each other is lower than a radial rigidity of another portion of the at least one of the male shaft and the female shaft.

2. The telescopic shaft according to claim 1, wherein the tooth grooves of the female shaft are fitted onto the protruding teeth of the male shaft such that there is no gap between the protruding teeth and the tooth grooves in a circumferential direction when engaged.

3. The telescopic shaft according to claim 1, wherein, on a tooth surface of the protruding teeth of the male shaft, a covering portion is formed to reduce sliding resistance between the protruding teeth and the tooth grooves of the female shaft.

* * * * *